Figure 1:
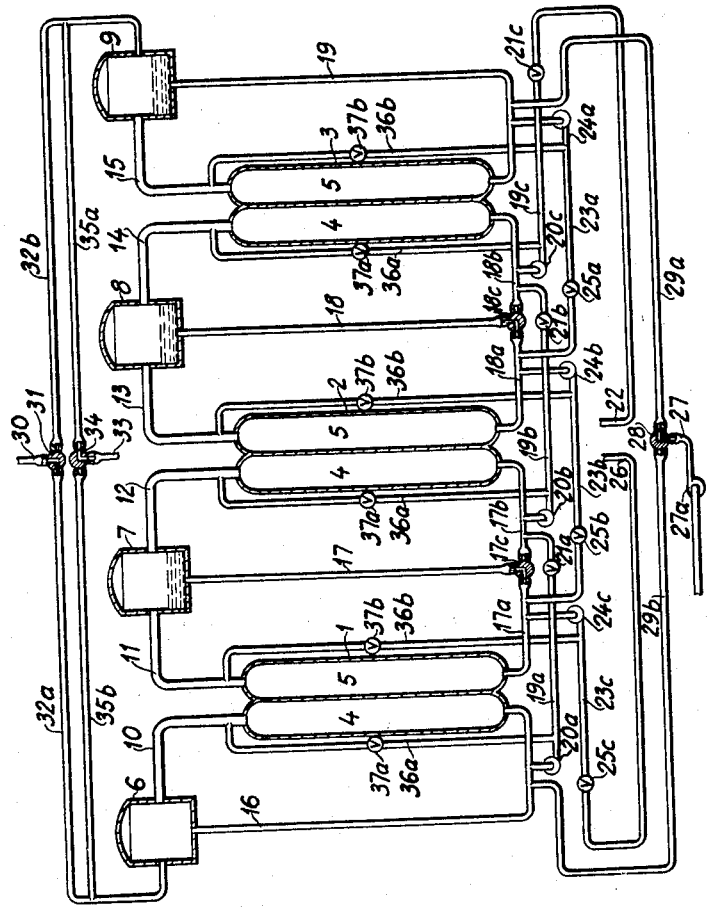

Feb. 14, 1956

C. J. LOCKMAN 2,734,565

HEAT TREATING A FLUID SUBSTANCE

Filed Jan. 19, 1951

7 Sheets-Sheet 1

Inventor:
Carl Johan Lockman
By Jamieson Marble
his Attorney

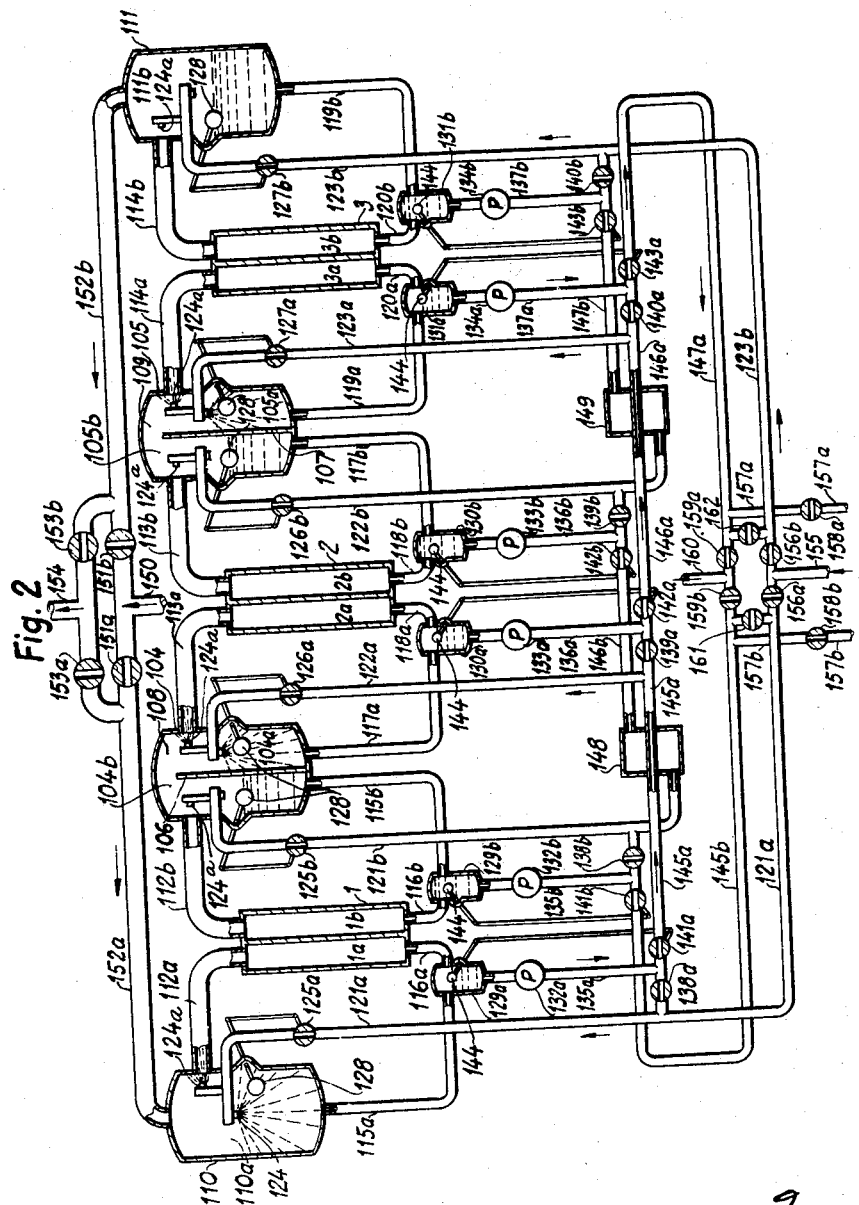

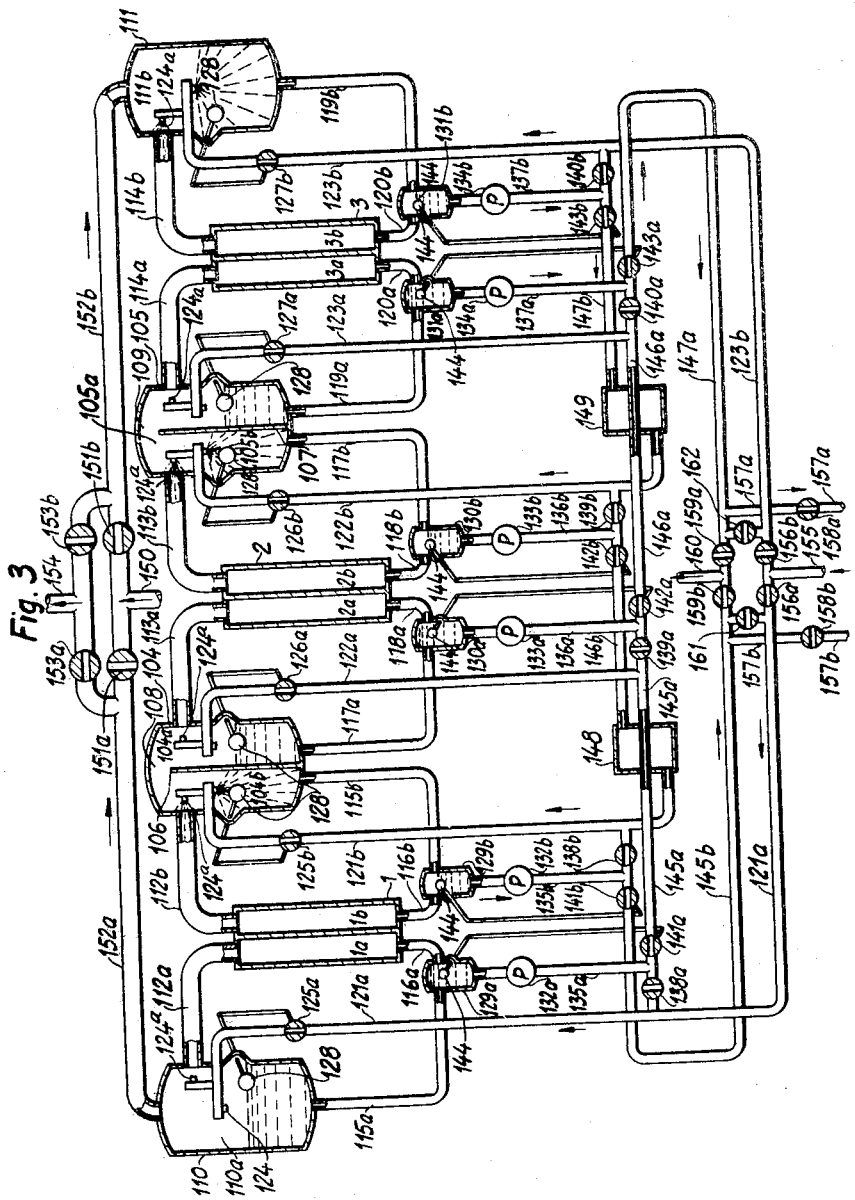

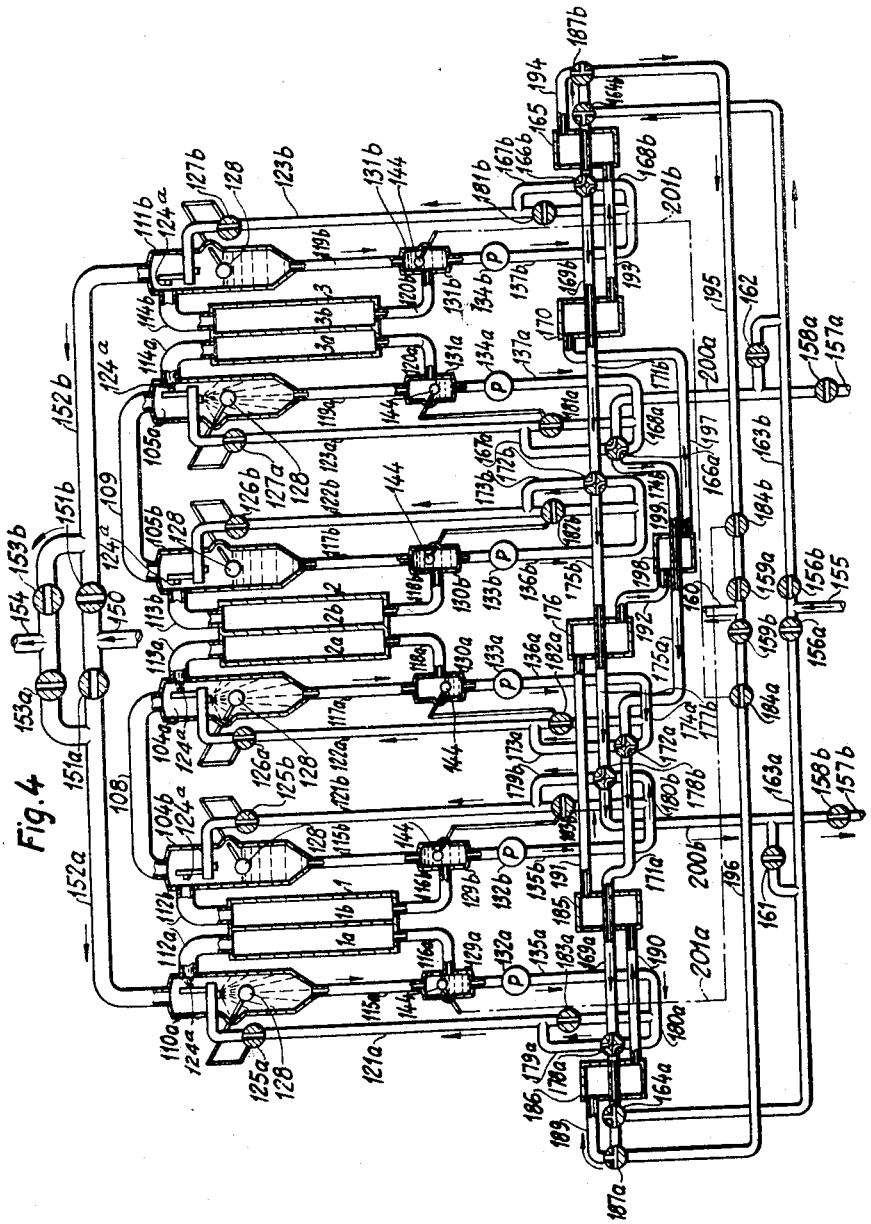

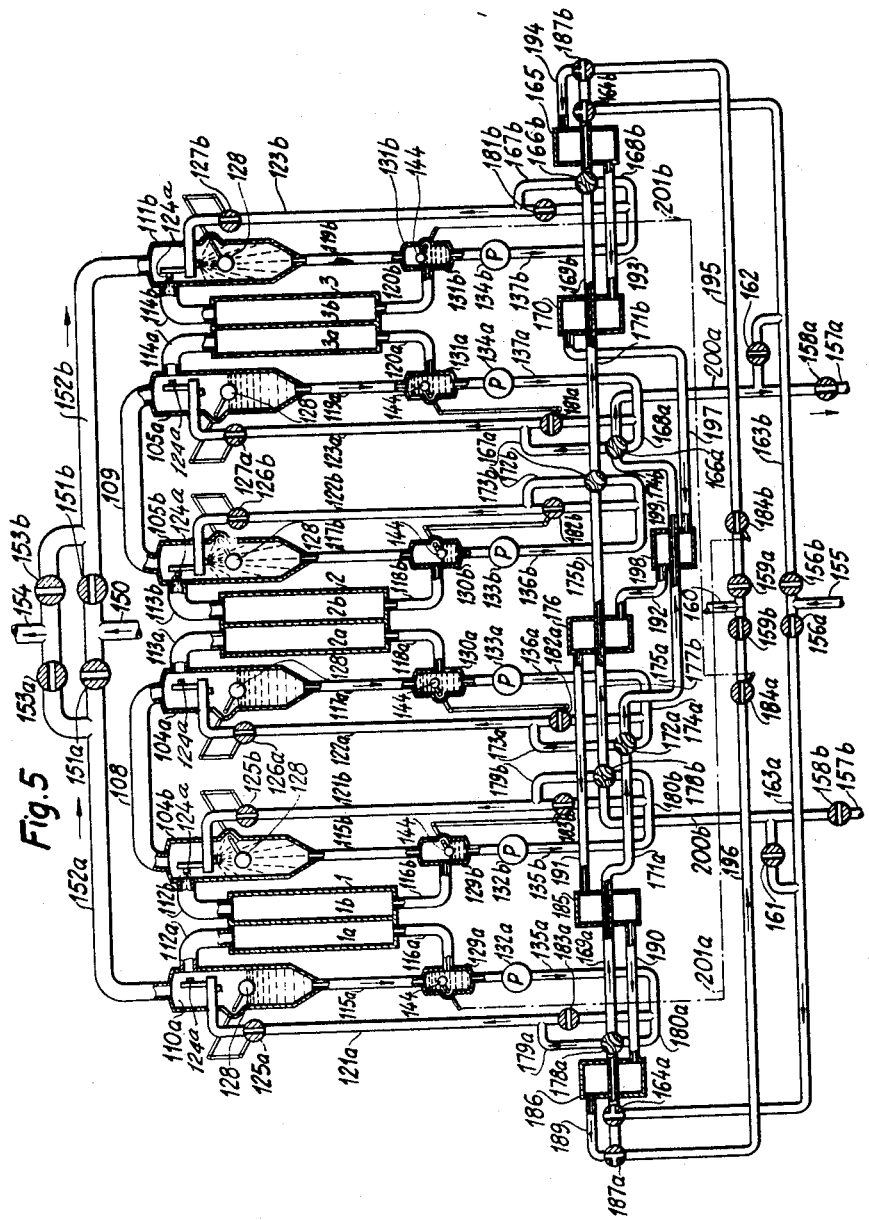

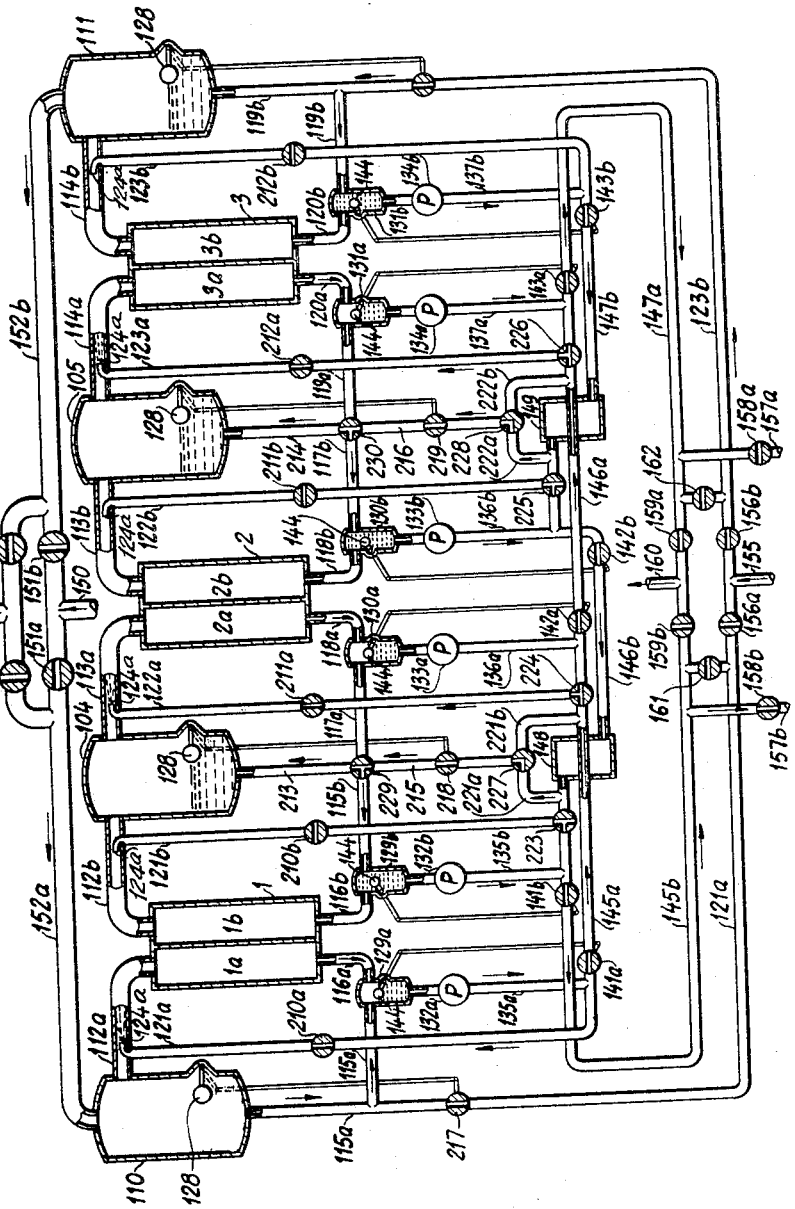

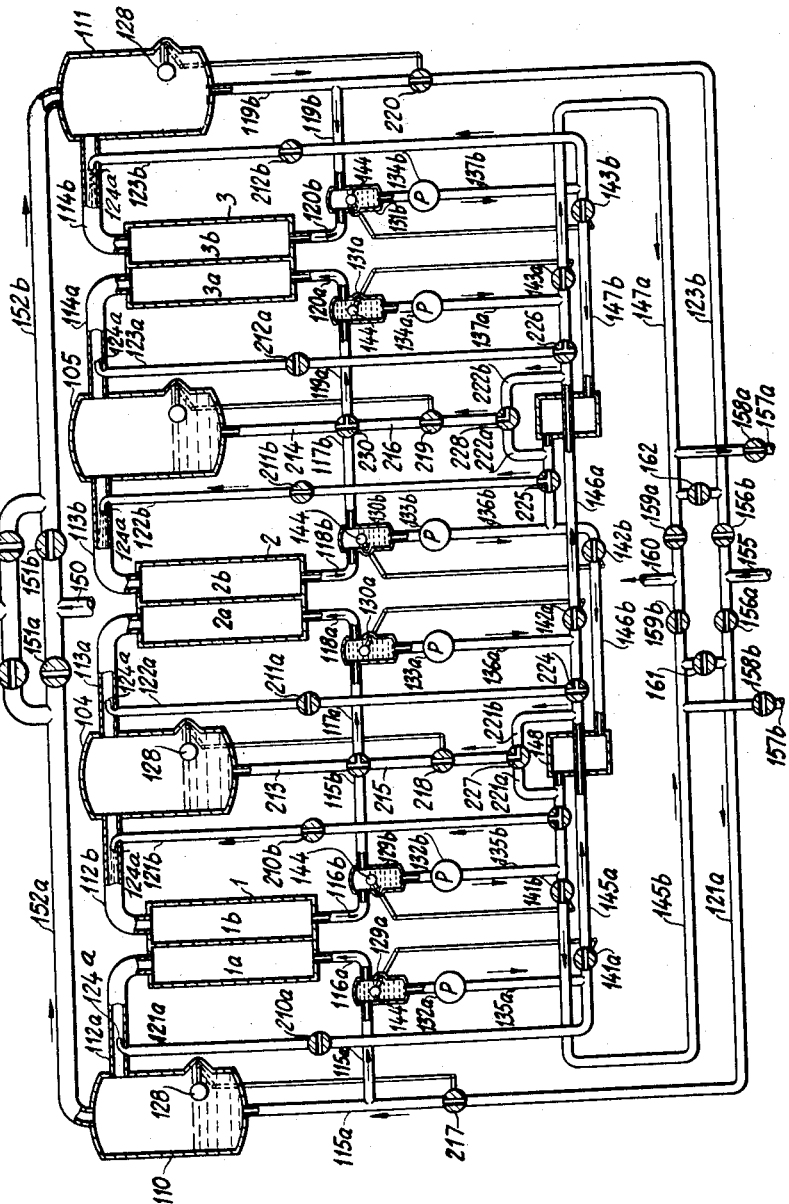

United States Patent Office 2,734,565
Patented Feb. 14, 1956

2,734,565
HEAT TREATING A FLUID SUBSTANCE

Carl Johan Lockman, Stockholm, Sweden, assignor, by mesne assignments, to Rosenblad Corporation, New York, N. Y., a corporation of New York Application January 19, 1951, Serial No. 206,752

6 Claims. (Cl. 159—20)

This invention relates to heat treating and more particularly to a method and apparatus for heat treating a fluid substance tending to deposit scale in a multiple stage system including a plurality of heat exchangers, and is a continuation-in-part of my copending application Serial No. 134,388 filed December 22, 1949, now Patent 2,707,991. In plants of this kind each heat exchanger has passages for conducting the substance and a vaporized heating medium in heat exchange relation.

It is desired, in such plants, to interchange the paths of flow of the fluid to be treated and the heating medium through the heat exchangers so that, at predetermined intervals of time, the latter medium is conducted through the passages which during the preceding cycle have served to conduct the fluid to be treated. In that manner, scale deposited from the fluid during its flow in the latter passages will be dissolved and removed by the action of the vapor and condensate conducted through the same passages during the succeeding cycle so as to keep the heat exchanging surfaces clean. This rinsing method has proved to be very effective and practical but a disadvantage is that in large plants the requisite changing valves for the supply of vapor will be very bulky and expensive.

It is therefore an object of this invention to enable an interchange of the paths of flow of the fluid and the heating medium in a more simple manner and to reduce the number of the requisite valves particularly for the supply of heating medium to a minimum.

It is a further object of the invention to change periodically the order in which said fluid to be treated and said heating medium are passed in succession from one heat exchanger to the other in the system, and at the same time to interchange the paths of flow of the fluid and heating medium through the individual heat exchangers and also through the associated conduits, valves, pumps, etc.

A still further object of the invention is to reverse the direction of flow of the heating vapor and if desired also the flow of the fluid through the system so as to alternate the first and last stages in the system, i. e. to cause the first heat exchanger in the series of stages to be the last heat exchanger in the succeeding cycle of operation, at the same time enabling an interchange of the passages of the fluid and the heating medium in the individual heat exchangers without the necessity of providing changing valves in the inlets of the heating medium (vapor) in each stage.

A further object of the invention is to provide a flash chamber intermediate each stage of the system and also an additional flash chamber connected to the first stage of the system and to enable the first and the last flash chambers in the series of stages to be connected alternatively to a common inlet for heating vapor and to a common outlet for the exhaust vapor, if desired communicating with a condenser for the exhaust vapor.

It is also an object of the invention to reverse the flow of the fluid to be treated simultaneously with reversing the path of flow of the heating medium, and to provide valved interconnection between the individual stages for this purpose.

A still further object of the invention is to provide, in a system of the kind described, circulation means in combination with spray nozzles or other liquid distributing means, for distributing condensate from the heating medium to the inner walls of flash chambers, and other parts of the system which have been contaminated by scale during a preceding cycle but will not be adequately flooded by condensate simply by interchanging the paths of flow of the heat exchanging media.

A further object of the invention is to maintain the amount of condensate circulating in the system substantially constant by withdrawing an amount of condensate corresponding to the new quantity of condensate produced in the system.

An object of the invention is also to provide for an equalization of the working conditions of all heat exchangers in the system by interchanging periodically in the heat exchangers the working conditions as regards the factors which are essential for the scale forming tendency.

A further object of the invention is to supply condensate to the individual stages in a quantity which is as nearly as possible proportional to the degree of scale formation in the separate stages during the preceding cycle.

Further objects and advantages of the invention will be apparent from the following description taken in conjunction with the accompanying drawings, wherein:

Figure 1 is a view partially in section diagrammatically illustrating the application of this invention to a multiple stage evaporation plant, Figure 2 is a similar view of another embodiment, Figure 3 shows the same embodiment as Fig. 2 but with the changing-over valves in other positions, Figure 4 illustrates a further embodiment, Fig. 5 shows the embodiment according to Fig. 4 with the changing-over valves in other positions and Figs. 6 and 7 show a still further embodiment with the valves in two different positions.

Parts of identical function are indicated by the same reference characters throughout the drawings.

Fig. 1 illustrates as an example an embodiment of a multiple stage system for a fluid substance, with three heating stages, each comprising a heat exchanger 1, 2 and 3, respectively. Each heat exchanger has two separate passages 4 and 5 for passing from the top to the bottom through one passage a vaporized heating medium in heat exchange relation with the fluid substance which is passed from the bottom to the top through the other passage. A piping 10 connects a chamber or vessel 6 to the top of the passage 4 of the first heat exchanger 1 and a piping 16 connects the chamber 6 to the bottom of the passage 4. Through a piping 15 a chamber or vessel 9 communicates with the top of the passage 5 of the last heat exchanger 3 of the system. By means of pipings 11 and 12 a further chamber or vessel 7 is connected to the top of the passage 5 of the heat exchanger 1 and to the passage 4 of the heat exchanger 2, respectively. A piping 17a from the bottom of the passage 5 of the heat exchanger 1 and a piping 17b from the bottom of the passage 4 of the heat exchanger 2 are adapted alternatively to be connected to a piping 17 communicating with the chamber 7. To this purpose a three way valve 17c is provided in the piping system 17, 17a, 17b. In a similar manner pipings 13 and 14 connect a chamber or vessel 8 to the top of the passage 5 of the heat exchanger 2 and to the passage 4 of the heat exchanger 3, respectively, and a three way valve 18c is adapted alternatively to connect a piping 18 from said chamber 8 to either of pipings 18a and 18b communicating with the bottom of passage 5 of the heat exchanger 2 and with the bottom of passage 4 of the heat exchanger 3, respectively.

A pump 20a is provided in a piping 19a having a regulating valve 21a and adapted to interconnect the passages 4 of the heat exchangers 1 and 2. In a similar manner a pump 20b is provided in a piping 19b having a regulating valve 21b and adapted to interconnect the passages 4 of the heat exchangers 2 and 3. There is also provided a pump 20c in a piping 19c having a regulating valve 21c and adapted to connect the passage 4 of the heat exchanger 3 to an outlet 22. Thus, these pipings 19a, 19b, 19c interconnect in series the passages 4 of the heat exchangers in the order 1 to 2 to 3 and finally to the outlet 22 from the plant. A piping 23a having a regulating valve 25a and a pump 24a interconnects the passages 5 of the heat exchangers 3 and 2, and a piping 23b with a regulating valve 25b and a pump 24b interconnects the passages 5 of the heat exchangers 2 and 1, while a piping 23c with a regulating valve 25c and a pump 24c connects the passage 5 of the heat exchanger 1 to an outlet 26. Thus, the pipings 25a, 25b and 25c interconnect in series the passages 5 of the heat exchangers in the order 3 to 2 to 1 and finally to the outlet 26 from the plant.

An inlet 27 to the plant with a pump 27a is connected to a three way valve 28 adapted alternatively to connect said inlet to either of two branch conduits 29a or 29b, of which the conduit 29a communicates with the passage 5 of the heat exchanger 3 while the conduit 29b communicates with the passage 4 of the heat exchanger 1. As aforesaid the passage 5 of the heat exchanger 3 is connected in series with the passages 5 of the heat exchangers 2 and 1 through the pipings 23a, 23b, and 23c while the passage 4 of the heat exchanger 1 is connected in series with the passages 4 of the heat exchangers 2 and 3 through the pipings 19a, 19b, 19c.

A further inlet 30 to the plant is connected to a three way valve 31 adapted alternatively to connect this inlet to either of two branch conduits 32a or 32b communicating with the chambers 6 and 9, respectively. Thus, by setting the three way valve 31 in one position or the other the inlet 30 may be connected alternatively to either the passage 4 of the heat exchanger 1 or the passage 5 of the heat exchanger 3.

An outlet 33 from the plant is connected to a three way valve 34 adapted alternatively to connect said outlet 33 to either of the chambers 9 or 6 through branch conduits 35a and 35b, respectively.

A modification of the plant may be made by providing conduits 36a and 36b having valves 37a and 37b, respectively, and adapted to connect the piping systems 19a, 19b, 19c and 23a, 23b, 23c with the tops of the passages 4 and 5, respectively.

In operation of the plant now described and assuming that the valves 17c, 18c, 28, 31 and 34 are set in the positions shown in the drawing a diluted fluid substance (for instance sulphite waste liquor) is supplied from an external source and fed into the heating system through the inlet 27 and the piping 29a to the passage 5 of the heat exchanger 3 and from this passage through the pipings 23a and 23b to the passages 5 of the other exchangers 2 and 1.

A vaporized heating medium is supplied into the passage 4 of the heat exchanger 1 through the inlet 30, the branch conduit 32a, the chamber 6 and the piping 10. In the heat exchanger 1 the heating vapor is condensed and the fluid substance supplied to the passage 5 of the same heat exchanger is heated and partially vaporized, causing a mixture of vapor and liquid to escape from the top of the passage 5 and to flow through piping 11 to chamber 7 in which vapor and liquid are separated and from which the liquid is returned in circulation through the piping system 17 and 17a to the bottom of said passage 5.

From chamber 7 the vapor is supplied as heating medium through piping 12 to passage 4 of the succeeding heat exchanger 2 in which an analogous heat exchanging process concerning the heating medium and the fluid to be heated will take place similarly as described with reference to the preceding heat exchanger 1. Vapor is passed from chamber 8 to the heat exchanger 3 in which said process is repeated once again and, finally, vapor is withdrawn from the chamber 9 and the heating system through the branch conduit 35a and the outlet 33. In similarity with the pipings 17 and 17a also the pipings 18, 18a serve as circulation system.

The concentrated fluid substance is withdrawn from the heating system through the outlet 26 by means of the piping 23c, the rate of withdrawal being regulated by valve 25c. The feeding of fluid substance from stage to stage is regulated by valves 25a and 25b, respectively.

Condensate from the individual passages 4 is withdrawn to the outlet 22 through the piping system 19a, 19b and 19c, the flow through the individual conduits being regulated by the valves 21a, 21b and 21c, respectively.

It will be understood that changing of the paths of flow according to the invention may be accomplished by operating five valves only for the whole plant, namely, by turning over the three-way valves 31, 34, 28, 17c and 18c from the positions shown so that the inlet 30 will be connected to the branch conduit 32b while the outlet 33 will be connected to the branch conduit 35b, the inlet 27 to the branch conduit 29b, and the pipings 17 and 18 will be connected to the piping 17b and 18b, respectively.

The result will be that not only are the paths of flow of the heating medium and the heated fluid interchanged in each heat exchanger but also the position of the pressure stages and the temperature stages will be reversed so that the whole scheme of flow of the different media from on heat exchanger to the other will be changed in a "mirror image" relation, thus equalizing the working conditions which are apt to influence the degree of the tendency of deposition of scale. The sense of the expression "mirror image relation" may be explained by reference to an example. Assuming that during one cycle of operation one medium is passed through a system of four stages 1, 2, 3, 4 in the order 3–4–2–1, then a change of the order into a "mirror image relation" during the next cycle of operation will mean that the media will pass through the system in the order 2–1–3–4. To arrive at this "mirror image order" one may imagine that the numeration of the series, 1, 2, 3, 4 be reversed into 4, 3, 2, 1 and that in this series the media be passed in the same numerical succession as during the first cycle. It will be appreciated that the result will be a new order 2–1–3–4 as aforesaid.

Of course the other media passes through the system in countercurrent relationship and upon a reversing of the cycle will change direction of flow in a "mirror image relation" just as in the case of the media described above.

It will also be appreciated that on interchanging the paths of flow of the heating medium and the scale forming fluid not only the passages of the heat exchangers but also the feeding pumps and most parts of the piping system of the plant will carry opposite media and benefit from the scale solving properties of the condensate.

By pass conduits 36a and 36b having valves 37a and 37b, respectively, may be connected between the pipings 10, and 19a, 11 and 23c, 12 and 19b, 13 and 23b, 14 and 19c, 15 and 23a, respectively, to circulate condensate through the heating medium passages so as to strengthen the scale solving effect therein.

Figures 2 and 3 illustrate more in detail an embodiment of a three-stage evaporator in which the fluid substance is caused to pass through the system from one heat exchanger to the other in the stage-wise order 3 to 2 to 1 and the condensate in the stage-wise order 1 to 2 to 3. In similarity with the embodiment according to Fig. 1 each heat exchanger has two separate passages 1a, 1b; 2a, 2b; 3a and 3b, respectively, for passing from the top to the bottom through one passage the vaporized heating medium in heat exchange relation with the fluid substance which is passed from the bottom to the top through the other passage. Between adjacent heat exchangers 1, 2 and 2, 3, respectively, there are arranged intermediate vessels 104 and 105, each containing two chambers 104a, 104b, and 105a and 105b, respectively, separated from each other by partition walls 106 and 107, respectively, which leave top passages 108 and 109 between adjacent chambers of each vessel 104, 105. Associated with the heat exchangers 1 and 3 at the end stages of the system there are also two vessels 110 and 111, respectively, containing end chambers 110a and 111b, respectively. In Figures 2 and 3 all passages 1a, 2a, 3a are at the top connected to the top part of the adjacent chamber 110a, 104a and 105a, respectively, by means of top connections 112a, 113a and 114a, respectively, and to the bottom part of the same chamber by means of bottom connections 115a, 116a, 117a, 118a, 119a and 120a, respectively. In similar manner all passages 1b, 2b, 3b are connected to the adjacent chambers 104b, 105b and 111b, respectively, by means of top connections 112b, 113b and 114b, respectively, and bottom connections 115b, 116b, 117b, 118b, 119b and 120b, respectively. Each chamber has a liquid inlet 121a, 121b, 122a, 122b 123a and 123b, respectively. At its end within the associated chamber each inlet terminates in one or more distribution devices 124 for the distribution of liquid over the internal wall surface of the chamber and into its top connection leading to the respective heat exchanger passage. Each inlet is provided with a control valve 125a, 125b; 126a, 126b; 127a and 127b, respectively, which opens and closes dependent upon the liquid level in the respective chamber and in such a way that the valve will close when the level rises and will open when the level sinks. To this purpose the said valve may be actuated by a float 128 in said chamber. To the bottom connection 116a, 116b, 118a, 118b, 120a and 120b between each heat exchanger passage and its associated chamber there is connected a float chamber 129a, 129b, 130a, 130b, 131a and 131b communicating with the inlet of said chamber by means of a conduit system comprising pumps 132a, 132b, 133a, 133b, 134a and 134b, pipes 135a and 135b, 136a, 136b, 137a and 137b, and valves 138a, 138b, 139a, 139b, 140a and 140b, respectively. Together with the said chamber inlets, bottom connections and float chambers each conduit system constitutes a circulation system through which liquid withdrawn from the heat exchanger passage may be recirculated through said passage and its associated chamber. Liquid may be withdrawn from each such circulation system through control valves 141a, 141b, 142a, 142b, 143a and 143b, respectively, to the appropriate chamber inlet of an adjacent stage through conduits 145a, 146a, 146b and 147b respectively, or to an outlet for discharging the liquid from the evaporator system through conduits 147a and 145b, respectively. The conduits 145a, 146b and 146a, 147b are connected to preheaters 148 and 149, respectively. Each of control valves 141a–143b is actuated by a float 144 so as to open and close according to the liquid level in the associated chamber, substantially as described with reference to valves 125a to 127b. Vaporized heating medium may be supplied to the evaporator through an inlet 150, valve 151a and a pipe 152a or a valve 151b and a pipe 152b alternatively, while vapor developed from the fluid substance is withdrawn from the evaporator system at a discharge outlet 154 through two alternative paths, namely through pipe 152b and a valve 153b or through pipe 152a and a valve 153a, respectively. Diluted fluid substance may be supplied into the evaporator system through an inlet 155, a valve 156b and an inlet conduit 123b or through a valve 156a and the inlet conduit 121a. At the same time concentrated fluid substance is withdrawn from the conduit 145b, the outlet 157b and the valve 158b or from the conduit 147a, outlet 157a and valve 158a, respectively, while condensate is withdrawn through conduit 147a and valve 159a or through conduit 145b and valve 159b to the discharge outlet 160. The function of the valves 161 and 162 will be explained in connection with the description of the mode of operation of the system.

In the position of the valves as shown in Fig. 2 the heating medium and its condensate pass through the evaporator from heat exchanger to heat exchanger in the order 1 to 2 to 3, all the conveying elements being indicated by reference characters having the index "a" in the drawing, while the fluid substance will be concentrated during its passage from heat exchanger 3 to 2 to 1, all the conveying elements being indicated by reference characters having the index "b" in the drawing, whereby the system will operate in the following manner: Diluted fluid substance is supplied into the system through the inlet 155, valve 156b and, valves 162 and 140b being closed, through the inlet conduit 123b directly into the chamber 111b and through the connections 119b and 120b into the passage 3b of the heat exchanger 3. The supply is continued until the liquid in the chamber 111b reaches a sufficient high level to close the control valve 127b. The float chamber 131b now will be filled entirely with liquid so that the valve 143b is maintained in its wide open position so as to allow the pump 134b, to convey the fluid substance through the connections 137b, 147b and the preheater 149 to the inlet 122b. The valve 139b being closed, the inlet 122b will supply fluid substance into the passage 2b of the heat exchanger 2 and its associated chambers 105b and 130b and connections in the same way as the passage 3b, and chamber 111b as well as the associated conduits will be supplied with fluid substance from the inlet conduit 123b. In a similar manner also the passage 1b and its corresponding chambers and connections will be supplied with fluid substance pumped from the float chamber 130b by means of the pump 133b through connection 136b, valve 142b, connection 146b, preheater 148 and inlet 121b, valve 138b being closed. From float chamber 129b fluid substance is withdrawn from the system by means of the pump 132b, connection 135b, valve 141b, connection 145b, outlet valve 158b and outlet 157b, valves 161, 156b and 159b being closed. The flow of fluid substance is controlled by means of the outlet valve 158b. All float actuated inlet valves will supply automatically the evaporator system and from stage to stage thereof with said fluid substance in an amount corresponding to the quantity withdrawn.

Valves 151b and 153a being shut vaporized heating medium is supplied through the heating medium inlet 150, valve 151a, pipe 152a, chamber 110a, top connection 112a into the heat exchanger passage 1a in which the heating medium is condensed while the fluid substance contained in the passage 1b is heated to boiling temperature. From passage 1b the fluid substance in a state consisting of a mixture of vapor and liquid passes through the top connection 112b to the chamber 104b, in which the vapor is separated from the liquid which is returned in circulation into the passage through conduits 115b, float chamber 129b and conduit 116b, while the vapor passes through the top connection 108, chamber 104a and top connection 113a into the passage 2a, in which it is utilized as heating medium so as to produce vapor from the fluid substance in the passage 2b. The latter vapor is passed through the top connection 113b, chamber 105b, top connection 109, chamber 105a and top connection 114a into the passage 3a, in which it is utilized for producing vapor from the fluid substance in the passage 3b. The latter vapor is withdrawn from the system through the top connection 114b, chamber 111b, pipe 152b, valve 153b and the vapor discharge outlet 154.

Heating medium condensate collected in the float chamber 129a is conveyed by means of the pump 132a through the connection 135a, valve 138a and inlet conduit 121a into the chamber 110a in which it is discharged through the spray nozzles 124 and thus sprayed onto the inner wall surface of the chamber 110a as well as into the top connection 112a through nozzle 124a. In this top connection 112a the sprayed condensate will be caught by the heating medium flow, and supplied into the passage 1a so as to flood the heating surface thereof right from its top. From the chamber 110a through the connection 115a and from the passage 1a through the connection 116a the condensate will then be returned in circulation into the float chamber 129a. An amount of condensate corresponding to the new quantity of condensate produced in the passage 1a is automatically withdrawn from the system through the valve 141a operated by the float 144 in the float chamber 129a so as to maintain the amount of condensate remaining in the circulation system substantially constant.

In the same way condensate is circulated through the heating medium passages of the other stages and their corresponding chambers and such condensate is withdrawn from the respective circulation systems in the manner described. The withdrawn condensate is passed from stage 1 into the circulation system of stage 2 through connection 145a and preheater 148 and from stage 2 to the circulation system of stage 3 through the connection 146a and the preheater 149. From stage 3 the total amount of condensate is withdrawn from the system through connection 147a, valve 159a and outlet 160.

In order to dissolve the scale deposited by the heated fluid substance by means of the heating medium condensate during continued evaporation of the fluid substance a change of the paths of flow of the substance and said heating medium is effected. Fig. 3 illustrates the same system as Fig. 2 in the changed-over positions of the valves. In this case the valves 138a, 139a, 140a, 156b, 158b and 159b are closed and the valves 156a and 158a opened so that the diluted fluid substance is supplied into the heat exchanger passage 1a instead of the passage 3b, while concentrated fluid substance is withdrawn from the heat exchanger passage 3a instead of from the passage 1b. The fluid substance passes, in a reversal numerical order or sequence as compared with the cycle of operation illustrated in Fig. 2, from one heat exchanger to the other through the conduits and preheater passages, which were conveying condensate during the preceding cycle shown in Fig. 2. The valves 151a and 153b are closed and the valves 151b, 153a, 159b, opened whereby vaporized heating medium is supplied to the chamber 111b instead of to chamber 110a as shown in Fig. 2, and fluid substance vapor is withdrawn from the chamber 110a instead of from chamber 111b as was the case in the preceding cycle. The path of flow of the heating medium now extends through the passages which are indicated by reference character b and which conveyed fluid substance during the preceding cycle. The heating medium passes from heat exchanger to heat exchanger in a reverse numerical order in relation to that in the preceding cycle. Moreover, the valves 138b, 139b, and 140b being opened the heating medium condensate will be circulated within each stage through the pumps, conduits and spaces which are indicated by reference character b and which were conveying fluid substance during the preceding cycle. Said condensate will flow through the different elements within each stage in the same numerical order as the fluid substance during the preceding cycle in the corresponding elements indicated by reference character b. The flow of the condensate from heat exchanger to heat exchanger will also take place in the conduits and preheater passages which were conveying fluid substance in the preceding cycle, and the condensate now passes through the system in a reverse numerical order in relation to the order during the preceding cycle. Finally, the condensate is withdrawn from the system from the passage 1b.

It will be clear that by periodically interchanging the paths of flow of the heat exchanging media in the manner described, all elements of the evaporator which are in contact with the scale depositing liquid, will be efficiently flooded by heating medium condensate during the succeeding cycle. It will also be realized that the described method of interchanging the paths will result in a reversal of the order (considering the temperature and pressure stages) in which the individual heat exchangers are connected to each other and that the numerical order in which condensate and fluid substance pass from heat exchanger to heat exchanger will be changed in a corresponding manner so as to comply with the same stage-wise order as during the preceding cycle of operation. Thus, the working conditions as regards the factors which are essential for the scale forming tendency, namely the temperature of the heating medium as well as the temperature, concentration and viscosity of the fluid substance, and also the conditions influencing the properties of the circulated condensate which are essential for its scale dissolving capacity, will be entirely interchanged periodically in the heat exchangers situated symmetrically in the series, the result being that to a considerable extent there will be obtained an equalization of the working conditions of all heat exchangers in the system, the function of which otherwise could be seriously hampered since one or more heat exchangers would work continuously under considerably more unfavourable conditions than the other ones. The same remarks also apply to the working conditions of all other parts and elements of the respective evaporator stages and of the preheaters.

The embodiment illustrated in Figures 4 and 5 is mainly based on the same principle as that shown in Figs. 2 and 3 but differs from the two latter in as much as the chambers 104a, 104b, 105a and 105b are contained in separate vessels and the passages 108 and 109 between them consist of external connections. Moreover, the conduit systems for the condensate and the fluid substance between the separate stages and the liquid inlet and outlet means have been modified so as to comply with a reversed flow direction of the condensate from stage to stage. Having the description of the elements of Fig. 2 in mind the embodiment according to Fig. 4 will be understood by the following description of its operation.

Diluted fluid substance is supplied into the system through the inlet 155, the valve 156b, the connection 163b, the three-way valve 164b, the preheater 165, the four-way valve 166b, the piping 167b and the inlet conduit 123b to the passage 3b in the same way as in Fig. 2. The path of flow of the fluid substance extends from the float chamber 131b through the pump 134b, pipings 137b and 168b, the four-way valve 166b, piping 169b, the preheater 170, piping 171b, four-way valve 172b, piping 173b and inlet conduit 122b to the passage 2b from float chamber 130b, through pump 133b, piping 136b, piping 174b, four-way valve 172b, piping 175b, the preheater 176, piping 177b, four-way valve 178b, piping 179b and inlet conduit 121b to the passage 1b and from the float chamber 129b, through the pump 132b, piping 135b, piping 180b and four-way valve 178b, from which the concentrated liquor is discharged from the system through the valve 158b, piping 200b and the outlet 157b.

Vaporized heating medium is supplied from the inlet 150 and passed from stage to stage, the fluid substance vapor is discharged and condensate from the heating medium circulated in substantially the same manner as in Fig. 2, the paths of flow being indicated in similar manner in Figures 2 and 4. According to Fig. 4 the condensate is passed from stage to stage and withdrawn from the system in a modified manner as compared with Figures 2 and 3. The condensate circulation systems include valves 181a and 181b, 182a and 182b, 183a and 183b, respectively. Valves 181a, 182a, 182b and 183b are actuated by the floats 144 in the float chambers 131a, 130a, 130b and 129b, respectively, so as to open at sinking liquid level and to close at rising liquid level. The valves 181b and 183a are operated independently of any action of this kind. By means of a motion transmission mechanism 201b and 201a, respectively, the floats 144 in the float chambers 131b and 129a are adapted to actuate valves 184a and 184b, respectively, in the reverse manner, causing them to open at rising liquid level and to close at sinking liquid level in the respective float chamber.

As the condensate level in the float chamber 131a rises, valve 181a will throttle the inlet conduit 123a so that condensate is discharged from said circulation system through piping 168a, four-way valve 166a, piping 199, preheater 198, piping 175a, four-way valve 172a and piping 173a through inlet conduit 122a to the chamber 104a and the passage 2a. In the same way condensate is passed from the float chamber 130a through pump 133a, pipings 136a and 174a, four-way valve 172a, piping 171a, preheater 185, piping 169a, four-way valve 178a and piping 179a, through inlet conduit 121a to the chamber 110a and the passage 1a. Condensate from float chamber 129a is discharged by means of the pump 132a through piping 135a, piping 180a, four-way valve 178a, preheater 186, and three-way valves 164a and 187a from which the condensate will be returned through the heat exchangers in the order 186-185-176-198-170-165 through pipings 189, 190, 191, 192, 197, 193, 194 and through the three-way valve 187b, piping 195 float operated valve 184b, and valve 159a to the outlet 160.

Regarding Fig. 4, it should be noted that at this period each of the exchangers 186, 185 and 198 serves as a stand-by, the exchangers 165, 170 and 176 being in operation, exchanging heat between condensate and fluid substance while in the period according to Fig. 5 the situation is reversed so that exchangers 185, 186 and 198 are in operation and exchangers 165, 170 and 176 are standing by.

Thus, the stage-wise path of flow of the condensate through the evaporator will occur in the opposite direction in relation to that shown in Fig. 2.

Fig. 5 illustrates the same evaporator system as Fig. 4 but with the valves reset so as to change the paths of flow of the separate media to the same effect as described with reference to Fig. 3. In similarity with the case according to Fig. 3 the fluid substance in the case according to Fig. 5 is supplied from the inlet 155 into the passage 1a instead of to passage 3b as was the case in the preceding cycle, and this fluid substance is withdrawn from passage 3a to the outlet 157a instead of from passage 1b to outlet 157b as was the case in the preceding cycle according to Fig. 4. As a result the same interchange of passages within each heat exchanger and from heat exchanger to heat exchanger will be effected as described with reference to Fig. 3 compared with Fig. 2, the paths of flow of the vaporized heating medium and the fluid substance vapor being the same as in Fig. 3. The condensate is passed from heat exchanger to heat exchanger in the order 1 to 2 to 3 instead of in the previous order 3 to 2 to 1 shown in Fig. 4, and the previous fluid substance conveying pumps and conduits and fluid substance conveying passages in the preheaters are now used for conveying the condensate. Within each stage the condensate is passed in circulation through the previous fluid substance conveying elements (indicated by reference character b) in the same way as in Fig. 3.

The fundamental difference between the embodiment illustrated in Figs. 2 and 3 on one hand and Figs. 4 and 5 on the other hand relates to the direction of flow of the condensate from heat exchanger to heat exchanger. In Figs. 2 and 3 this direction is the same as the direction of flow of the heating medium but in Figs. 4 and 5 the condensate flows in an opposite direction to the heating medium. Thus in the embodiment according to Figs. 2 and 3 the amount of circulating condensate, that is the dissolving medium, will increase from heat exchanger to heat exchanger in the same order as the temperature and pressure of the heat exchanging media decreases from heat exchanger to heat exchanger, while in the case according to Figs. 4 and 5 the amount of condensate will increase with increasing temperature and pressure.

Generally, the tendency of the fluid substance to deposit scale fluctuates from stage to stage in different ways, for instance dependent upon the temperature of the separate stages and of the stage-wise path of flow of the fluid substance. The stage-wise path of flow of the condensate during one cycle should be chosen so as to supply to the separate stages a quantity which as nearly as possible is proportional to the degree of scale formation in the separate stages during the preceding cycle.

Experience has shown that in an evaporator system for evaporating sulphite waste liquor and substantially constituted by vacuum stages it is preferred to use a flow scheme of the kind shown in Figs. 2 and 3 while in the case of an evaporator comprising substantially super-atmospheric stages a flow-scheme of the kind shown in Figs. 4 and 5 is suitable. In exchanging the paths of flow of the different media it is important that the exchange takes place without any considerable loss of fluid substance. It is of course possible to withdraw the whole content of fluid substance from the system to some receptacle and then to reset the valves, pump said substance back into the previously heating medium passages and continue the operation. However, the waste of time for withdrawing and resupplying the fluid substance is considerable and, moreover, there will arise additional costs for a storage receptacle which is utilized relatively infrequently.

According to the invention this disadvantage may be eliminated by performing the interchanging process in a special manner without any withdrawal of fluid substance from the system and without substantial disturbance of the evaporation process. To this purpose, the fluid substance is transferred directly into the heating medium spaces through a by-pass connection between the outlet for concentrated fluid substance and the inlet conduit for the fluid substance. During this process the path of flow of the heating medium is reversed so that the transferred fluid substance will be replaced by condensate in the previous fluid substance conveying spaces. On completing this process, the by-pass conduit is closed and the remaining valves reset as described so as to suit the new cycle. It will be understood that in this way the time of interruption of the evaporation process is reduced to a minimum. On the other hand, on starting the new cycle, no condensate having been withdrawn during the interchanging period, the new fluid substance spaces will, in addition to the fluid substance, still contain condensate from the preceding cycle. Such condensate has to be evaporated before the normal process is restarted, which means a certain loss of time and of heating medium, which however, on account of the relatively small amount of condensate contained in the system, is not sufficiently important to weaken the economical aspect of the method in any considerable way.

In detail the operation of changing-over the valves from the cycle of Fig. 2 to the cycle of Fig. 3 may be accomplished in the following way:

(1) Closing valves 138a, 139a and 140a in the condensate circulation systems.
(2) Closing valves 158b (concentrate outlet), 156b (fluid substance inlet) and 159a (condensate outlet).
(3) Opening by-pass valve 161.
(4) Interchanging supply of vaporous heating medium and withdrawal of fluid substance by closing valves 151a and 153b and by opening valves 153a and 151b.
(5) Allowing the fluid substance to pass over completely.

(6) Closing valve 161.
(7) Opening valve 156a to the fluid substance inlet and valve 159b to the condensate outlet.
(8) Allowing the fluid substance to reach the required degree of concentration.
(9) Starting the regulation of the withdrawal of concentrate through valve 158a.
(10) Opening valves 138b, 139b and 140b to open the condensate circulation systems.

The apparatus is now operating in accordance with the cycle described with reference to Fig. 3. Changing over the valves to the cycle according to Fig. 2 is accomplished in a corresponding way by resetting the valves in the same order, with the exception that valve 162 now is operated instead of valve 161.

The change from the cycle according to Fig. 4 to the cycle according to Fig. 5 may be accomplished in a somewhat modified manner:

(1) Closing the valve 158b for the concentrated fluid substance.
(2) Closing the inlet valve 156b for fluid substance and the outlet valve 159a for the condensate.
(3) Opening the by-pass valve 161.
(4) Closing the inlet valve 151a for the heating medium and the outlet valve 153b for the vapor.
(5) Resetting the four-way valves 166a, 166b, 172a, 172b, 178a and 178b to bring their other pairs of adjacent connections in communication with each other.
(6) Opening the inlet valve 151b for the heating medium.
(7) Allowing the fluid substance to pass over completely.
(8) Closing the by-pass valve 161.
(9) Opening the valve 156a to the fluid substance inlet and the valve 159b to the condensate outlet.
(10) Allowing the fluid substance to reach sufficient degree of concentration.
(11) Starting the regulation of withdrawal of concentrate through valve 158a.

The apparatus is now operating in accordance with the cycle shown in Fig. 5. Changing over to the cycle according to Fig. 4 is effected in substantially the same manner as described with reference to changing over from operation according to Fig. 3 to operation according to Fig. 2.

The heat exchangers shown diagrammatically may be of the type shown in U. S. patent application Serial No. 179,256 filed August 14, 1950.

It is an important feature of the invention that the changing-over or switching operations aimed at are accomplished by means of a small number of large size valves, namely the four valves 151a, 151b, 153a, 153b conveying vaporous heating medium and vapor, which owing to the large volumes of the media passing therethrough must have considerably larger dimensions than the other valves of the system, which are conveying liquid only. As the large valves are adapted to receive vaporous medium free from contamination of any scale depositing medium they will function satisfactorily without being subjected to any periodical cleaning action by means of the condensate.

Figures 6 and 7 illustrate an embodiment of the invention in which all heating surfaces, pumps and most parts of the conduit systems may be subjected to the same periodical cleaning action as in the preceding embodiments. For sake of simplicity, however, the separator chambers 104, 105, 110, 111 as shown in Figures 6 and 7 are not subjected to the cleaning action from the condensate. For instance this simplified arrangement may be adopted if the tendency of the fluid substance to precipitate scale on non-heated surfaces is relatively small.

Having the description of Figs. 2 and 3 in mind it will be clear that the heating medium supplied through the inlet 150 according to Figs. 6 and 7 will follow the same paths as described with reference to Figures 2 and 3 and the same remark applies to the circulation of the heating medium condensate and the fluid substance within each stage, except that in Figs. 6 and 7 there are provided no means for distributing condensate on the internal walls of the separator chambers 104, 105, 110, 111. In view of the general similarity between the paths of flow according to Figs. 2 and 3 on one hand and Figs. 6 and 7 on the other hand no detailed description of the latter figures seems to be necessary. It should be noted, however, that according to Figures 6 and 7 there are provided additional valves 210a, 210b, 211a, 211b, 212a and 212b in the conduits 121a, 121b, 122a, 122b, 123a and 123b, respectively, in order to close any of these conduits during the cycle of operation in which said conduit is not utilized for circulating condensate. In addition, the intermediate separator chambers 104, 105 are provided with conduits 213, 214, respectively, which by means of three-way valves 229, 230, respectively, may be connected alternatively to the bottom of either of the two associated heat exchanger passages 1b, or 2a and 2b or 3a, respectively. The floats 128 of the chambers 110, 104, 105 and 111, respectively, are adapted to operate valves 217, 218, 219 and 220, respectively, substantially as described with reference to the corresponding valves of Figs. 2 and 3.

The paths of flow of the condensate and the fluid substance from stage to stage through the system are somewhat modified in the embodiment according to Figures 6 and 7. As shown in Figure 6 the path of flow of the condensate will pass from the float chamber 129a through pump 132a, piping 135a, valve 141a, piping 145a, preheater 148 and three-way valve 224 into the condensate circulation system of the passage 2a, then from the float chamber 130a through pump 133a, piping 136a, float operated valve 142a, piping 146a, preheater 149 three-way valve 226 into the condensate circulation system of the passage 3a and finally from the float chamber 131a through pump 134a, piping 137a, float operated valve 143a, piping 147a, valve 159a and out through the outlet 160.

The path of flow of the fluid substance in Fig. 6 will pass from the inlet 155 through valve 156b, piping 123b, and float operated valve 220 into the circulation system of fluid substance of the passage 3b, then from the float chamber 131b through pump 134b, piping 137b, the float operated valve 143b, piping 147b, preheater 149, piping 222a, two-way valve 228, float operated valve 219, piping 216 and three-way valve 230 into the circulation system of the fluid substance of the passage 2b, then from float chamber 130b, piping 136b, float operated valve 142b, piping 146b, preheater 148, piping 221a, two-way valve 227 and float operated valve 218 into the fluent-substance-circulation system of passage 1b and finally from float chamber 129b through pump 132b, piping 135b, float operated valve 141b, piping 145b, valve 158b and out through the discharge outlet 157b for the concentrated substance.

From the arrows indicating the paths of flow in the individual conduits Fig. 7 will be understood without detailed description. For instance, by changing over the two-way valves 227 and 228, the medium in the conduit 145a and 146a, respectively, will now pass through piping 221b and 222b, respectively instead of through piping 221a and 222a as was the case in Fig. 6.

What I claim is:

1. A method of heat treating a fluid substance tending to deposit scale in a multiple stage system including a plurality of heat exchangers, each heat exchanger having passages for conducting said substance and a heating medium in heat exchange relation, said method comprising the steps of passing said substance through said system from stage to stage, passing a vaporized heating medium through the first stage of said system, utilizing flash vapor from said substance in each stage as a heating medium for the succeeding stage, periodically changing the flow of the substance to be treated and the flow of the heating medium so as to cause them to pass through the series of said heat exchangers in the opposite order as compared with the order of flow during an immediately preceding cycle, and interchanging the paths of flow of said substance and heating medium through the individual heat exchangers.

2. A method as defined in claim 5 wherein simultaneously with interchanging the paths of flow of the liquid and the vaporized heating medium, condensate from the heating medium is passed from stage to stage through passages and elements which during the preceding cycle of operation were conveying scale depositing liquid and vice versa.

3. A multiple stage heat treating system comprising a plurality of heat exchangers, each having passages for conducting a vaporized heating medium and a fluid substance tending to deposit scale in heat exchange relation, a chamber having a vapor space connected to the top a chamber having a vapor space connected to the top part of the heating medium passage of the heat exchanger of the first stage in the system and also connected to the bottom part of the same passage, chamber means intermediate adjacent stages of the system, each chamber means having a vapor space connected to the top part of the fluid substance passage of the preceding heat exchanger and also connected to the top part of the heating medium passage of the succeeding heat exchanger, pipe connections from the lower portion of said chamber means to the bottom part of each of the two last mentioned passages, a chamber having a vapor space connected to the top part of the fluid substance passage of the heat exchanger of the final stage and also having a fluid space connected to the bottom part of said last named passage, a conduit system connecting in series the heating medium passages of the individual heat exchangers for passing heating medium from one heat exchanger to the other, a second conduit system connecting in series the fluid substance passages of the individual heat exchangers for passing fluid substance from one heat exchanger to the other, an outlet from each of said conduit systems, valved connections for alternate supply of fluid substance from an external source to either terminal of the fluid substance passages interconnected by said conduit systems, valved connections for alternate withdrawal of fluid substance vapor from either of the chambers associated with the first and final heat exchangers, and valve connections for alternate supply of vaporized heating medium from an external source to either of the heat exchanger passages associated with said chambers.

4. A multiple stage heat treating system comprising a plurality of heat exchangers, each having passages for conducting a vaporized heating medium and a fluid substance tending to deposit scale in heat exchange relation, a chamber having a vapor space connected to the top part of the heating medium passage of the heat exchanger of the first stage in the system and also connected to the bottom part of the same passage, chamber means intermediate adjacent stages of the system, each chamber means having a vapor space connected to the top part of the fluid substance passage of the preceding heat exchanger and also connected to the top part of the heating medium passage of the succeeding heat exchanger, pipe connections from the lower portion of said chamber means to the bottom part of each of the two last mentioned passages, a chamber having a vapor space connected to the top part of the fluid substance passage of the heat exchanger of the final stage and also having a fluid space connected to the bottom part of said last named passage, a conduit system connecting the heating medium passages of the individual heat exchangers for passing heating medium from one heat exchanger to the other, a second conduit system connecting the fluid substance passages of the individual heat exchangers for passing fluid substance from one heat exchanger to the other, an outlet from each of said conduit systems, means for alternately supplying fluid substance from an external source to either terminal of the fluid substance passages interconnected by said conduit systems, means for alternately withdrawing fluid substance vapor from either of the chambers associated with the first and final heat exchangers and means for alternately supplying vaporized heating medium from an external source to either of the heat exchanger passages associated with said chambers.

5. A method of effecting evaporation of a liquid tending to deposit scale in a multi-stage evaporation plant with liquid medium space and heating medium space wherein said liquid is passed from stage to stage and through said liquid medium space of each stage while a vaporized heating medium is introduced into the heating medium space of the first stage and heating medium in the form of flash vapor obtained from the heated liquid is passed from the liquid medium space of said first stage and of each intermediate stage to the heating space of each succeeding stage, said method comprising the steps of periodically interchanging the paths of flow of the liquid and the heating media by passing the liquid from stage to stage through the space of each stage which previously was a heating medium space, introducing the vaporized heating medium into the previous liquid medium space of the previous last stage with regard to heat degeneration, passing flash vapor heating medium from the previous heating medium space of said previous last stage and of each intermediate stage to the previous liquid medium space of each previous preceding stage and withdrawing the flash vapor from the previous first stage with regard to heat degeneration from the evaporation process so that after the interchanging operation, the previous first stage will constitute the last stage and the intermediate stages will change their consecutive order correspondingly with regard to heat degeneration.

6. A method of effecting evaporation of a liquid tending to deposit scale in a multi-stage evaporation plant with separate liquid space and heating medium space in each stage each of said spaces communicating with a vapor-liquid separator chamber, said method comprising the steps of passing said liquid through the liquid spaces of each stage in succession, passing a vaporized heating medium through a first separator chamber, in which at the time no separation process takes place, into the heating medium space of the first stage, passing flash vapor and heated liquid obtained from the liquid space of said first stage into a second separator chamber, separating said vapor from said heated liquid in said second separator chamber, passing the separated vapor as heating medium through a third separator chamber, in which at the time no separation process takes place, into the heating medium space of the succeeding stage, treating the liquid in the same way in following stages, passing flash vapor and heated liquid from the liquid space of the last stage into a last separator chamber, separating said vapor from said heated liquid in said last separator chamber, withdrawing the separated vapor from the evaporation process, passing the liquid from stage to stage through liquid passing the liquid from stage to stage through liquid spaces and heating medium condensate through condensate spaces in condensate-liquid heat exchange, passing heating medium condensate over the inner walls of those of said separator chambers in which at the time no separating process takes place, periodically interchanging the paths of flow of the heating medium, the heating medium condensates and the liquid to be evaporated by passing the liquid from stage to stage through the previous condensate spaces and through the previous heating medium space of each stage, passing condensate through the previous liquid conveying spaces from stage to stage and over the inner walls of those of the separator chambers, in which previously vapor-liquid separation took place, passing the vaporized heating medium through the previous last separator chamber to the previous liquid space of the previous last stage with regard to heat degeneration, passing flash vapor and heated liquid from the previous heating medium space of said last stage to the separator chamber through which separated flash vapor previously was passed as heating medium to said previous heating stage, separating said vapor from said heated liquid in said separator chamber, passing the separated vapor as heating medium through the previous preceding separator chamber where previously vapor-liquid separation took place, but where now no such separation process occurs, into the previous liquid space of the previous preceding stage, repeating the operation just described from stage to stage in a reverse sequence to that during the previous cycle, passing flash vapor and heated liquid from the previous heating medium space of the previous first stage with regard to heat degeneration into the previous first separator chamber where previously no separation took place, separating said vapor from said heated liquid in said first separator chamber, withdrawing the separated vapor from the evaporation process so that after the interchanging operation the previous first stage will constitute the last stage and the intermediate stages will change their consecutive order correspondingly.

References Cited in the file of this patent

UNITED STATES PATENTS

| | | |
|---|---|---|
| 936,760 | Childs | Oct. 10, 1911 |
| 1,005,600 | Childs | Oct. 10, 1911 |
| 1,582,066 | Moore | Apr. 27, 1926 |
| 1,582,067 | Moore | Apr. 27, 1926 |
| 2,012,668 | Jahn | Aug. 27, 1935 |
| 2,032,087 | Goth | Feb. 25, 1936 |
| 2,032,182 | Oman | Feb. 25, 1936 |
| 2,262,519 | Talton | Nov. 11, 1941 |
| 2,488,598 | Lockman | Nov. 22, 1949 |
| 2,490,750 | Grewin et al. | Dec. 6, 1949 |